(12) United States Patent
Yoon et al.

(10) Patent No.: US 9,249,718 B2
(45) Date of Patent: Feb. 2, 2016

(54) INTERCOOLER FOR VEHICLE (75) Inventors: Sung Il Yoon, Seoul (KR); Hwan Mook Lim, Incheon (KR)

(73) Assignees: Hyundai Motor Company, Seoul (KR); Kia Motors Company, Seoul (KR)

(*) Notice: Subject to any disclaimer, the term of this patent is extended or adjusted under 35 U.S.C. 154(b) by 667 days.

(21) Appl. No.: 13/529,874

(22) Filed: Jun. 21, 2012

(65) Prior Publication Data
US 2013/0098341 A1 Apr. 25, 2013

(30) Foreign Application Priority Data
Oct. 19, 2011 (KR) .................. 10-2011-0107149

(51) Int. Cl.
*F02B 29/04* (2006.01)
*F02M 25/07* (2006.01)
*F28F 9/00* (2006.01)
*F28B 9/08* (2006.01)
*F28D 1/053* (2006.01)
*F28F 1/02* (2006.01)
*F28F 9/02* (2006.01)
*F28D 21/00* (2006.01)

(52) U.S. Cl.
CPC ......... *F02B 29/0456* (2013.01); *F02B 29/0468* (2013.01); *F02B 29/0475* (2013.01); *F02M 25/0736* (2013.01); *F28B 9/08* (2013.01); *F28D 1/05333* (2013.01); *F28F 1/022* (2013.01); *F28F 9/002* (2013.01); *F28D 2021/0082* (2013.01); *F28F 2009/029* (2013.01); *Y02T 10/121* (2013.01); *Y02T 10/146* (2013.01)

(58) Field of Classification Search
CPC ......... F24F 2013/227; F28F 1/10; F28F 1/40; F28F 2215/10; F28D 21/0012; F28D 21/0003; F28D 2021/004; F28D 2021/008; F28D 2021/0082; F28D 2021/0091; F02G 2256/00; F02G 2256/02; F02G 2256/04; F02B 29/0456; F02B 29/0468; F02B 29/0475; F28B 9/08; F17C 2260/016; F16L 9/19
USPC .......... 165/52; 123/568.11, 568.12, 542, 563; 60/605.2
See application file for complete search history.

(56) References Cited

U.S. PATENT DOCUMENTS 2,305,114 A * 12/1942 Sisson ........................ F25D 3/06
62/241
2,737,936 A * 3/1956 Clarke ........................ 123/568.12
3,596,495 A * 8/1971 Huggins .................... 72/370.18
(Continued)

FOREIGN PATENT DOCUMENTS

JP 2001-174173 A 6/2001
JP 2003-328863 A 11/2003
(Continued)

*Primary Examiner* — Erick Solis
*Assistant Examiner* — Anthony L Bacon
(74) *Attorney, Agent, or Firm* — Morgan, Lewis & Bockius LLP (57) ABSTRACT An intercooler for a vehicle that cools a mixture of EGR gas and exhaust gas may include a cooler main body with an inlet portion through which the mixture flows in formed at one side thereof and an outlet portion through which the mixture flows out formed at the other end side thereof, connection tubes that connect the inlet portion with the outlet portion and are arranged from an upper side to a lower side of the cooler main body to cool the mixture, and a condensate storage unit that connects a lower end portion of the inlet portion with a lower end portion of the outlet portion and stores the condensate that is formed in the connection tubes.

9 Claims, 6 Drawing Sheets

(56) References Cited

U.S. PATENT DOCUMENTS

| | | |
|---|---|---|
| 6,301,887 B1 * | 10/2001 | Gorel et al. .................. 60/605.2 |
| 7,131,263 B1 * | 11/2006 | Styles .............................. 60/278 |
| 2009/0090486 A1 * | 4/2009 | Geskes et al. ................... 165/51 |
| 2011/0079002 A1 * | 4/2011 | Siuchta ........................... 60/309 |
| 2011/0107760 A1 * | 5/2011 | Quinn et al. .................... 60/599 |
| 2011/0225959 A1 * | 9/2011 | Sailer et al. .................... 60/309 |
| 2011/0232603 A1 * | 9/2011 | Bolte et al. .................... 123/345 |
| 2011/0247320 A1 * | 10/2011 | Ruckwied et al. .............. 60/299 |
| 2011/0253111 A1 * | 10/2011 | Pursifull ................. F02B 21/02 |
| | | 123/559.1 |
| 2014/0026597 A1 * | 1/2014 | Epstein .................. B64D 37/30 |
| | | 62/48.2 |

FOREIGN PATENT DOCUMENTS

| | | | |
|---|---|---|---|
| JP | 2009-108761 A | | 5/2009 |
| KR | 10-2010-0020196 A | | 2/2010 |
| WO | WO2011157495 | * | 5/2011 |

\* cited by examiner

INTERCOOLER FOR VEHICLE

CROSS-REFERENCE TO RELATED APPLICATION

The present application claims priority of Korean Patent Application Number 10-2011-0107149 filed Oct. 19, 2011, the entire contents of which application is incorporated herein for all purposes by this reference.

BACKGROUND OF INVENTION

1. Field of Invention

The present invention relates to an exhaust gas recirculation (hereinafter, "EGR") system of a vehicle. More particularly, the present invention relates to an intercooler for a vehicle that cools a mixed gas or mixture of EGR gas and intake air to a predetermined temperature in an EGR system.

2. Description of Related Art

Generally, an EGR system is provided in a diesel vehicle, and recirculates exhaust gas that is exhausted from an exhaust manifold of an engine to an intake manifold to reduce NOx of the exhaust gas and improve fuel consumption efficiency of the engine.

The EGR system includes a low pressure EGR system that can recirculate exhaust gas that passes a catalyst such as a DPF (diesel particulate filter) to intake air of an intake manifold.

Here, the low pressure EGR system includes an intercooler that cools a mixed gas of EGR gas and intake air to a predetermined temperature to supply it to an intake manifold.

However, while the mixed gas is cooled down in the intercooler, the saturated vapor of the EGR gas is condensed to generate a condensate.

The condensate gathers in a flowing path of the mixed gas and interferes with the flowing of the mixed gas to deteriorate intake efficiency of the intercooler and reduce a cooling area of the cooler such that the cooling efficiency is deteriorated.

Also, the condensate can be frozen in the flowing path of the mixed gas to be able to generate cracks in the flowing path of the mixed gas.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an intercooler for a vehicle having advantages of storing a condensate that is generated during a cooling process of a mixed gas of EGR gas and intake gas.

Various aspects of the present invention provide for an intercooler for a vehicle that cools a mixed gas of EGR gas and exhaust gas may include a cooler main body with an inlet portion through which the mixed gas flows in formed at one side thereof and an outlet portion through which the mixed gas flows out formed at the other end side thereof, connection tubes that connect the inlet portion with the outlet portion and are arranged from an upper side to a lower side of the cooler main body to cool the mixed gas, and a condensate storage unit that connects a lower end portion of the inlet portion with a lower end portion of the outlet portion and stores the condensate that is formed in the connection tubes.

The condensate storage unit may include a tube-type reservoir tank that is disposed at the cooler main body at a lowest side of the connection tubes and is disposed along the connection tube.

First connection passages may be formed in the connection tube along the length direction thereof to connect the inlet portion with the outlet portion.

The first connection passages may be formed by first barriers that are formed along the length direction thereof in the connection tube.

The reservoir tank may include a first part that is disposed in an up and down direction along the length direction of the connection tube, and a second part that is integrally formed with both edge ends of the first part and has a convex rounded shape.

The second connection passages that connect the inlet portion with the outlet portion may be formed along the length direction thereof in the reservoir tank.

The second connection passages may be divided by second barriers that are disposed in a length direction thereof inside the reservoir tank.

Ribs may protrude on both surfaces of the second barrier along the length direction of the reservoir tank.

One rib that is formed on one side surface of a single second barrier may be disposed between a pair of ribs that are formed the other side surface of the single second barrier.

One rib that is formed at one side surface on a single second barrier may be formed at the same position as another rib that is formed on the other surface of the second barrier facing the single second barrier.

One rib that is formed at one side surface on the single second barrier may be formed between a pair of ribs that are formed on the other surface of the second barrier facing the single second barrier.

A rounded portion of a predetermined curvature may be formed at a portion where a rib is connected to the second barrier.

At least one rib may protrude on an interior surface of the second part along the length direction thereof.

Various aspects of the present invention provide for a condensate storage unit that can store the condensate to maximize the storage capacity compared to the generated total amount of condensate.

Accordingly, the storage capacity of the condensate may be improved through the condensate storage unit, and crack damage of the intercooler that may occur because of freezing of the condensate can be prevented.

Also, the second barriers may be formed in the reservoir tank of the condensate storage unit, and because the ribs are formed on the interior surface of the second barriers and the second part, sway of the condensate that is stored in the second connection passages is prevented and noise thereof can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clarify the present invention, parts that are not connected with the description will be omitted, and the same elements or equivalents are referred to by the same reference numerals throughout the specification.

Also, the size and thickness of each element are arbitrarily shown in the drawings and the present invention is not necessarily limited thereto, and in the drawings, the thickness of layers, films, panels, regions, etc., are exaggerated for clarity.

Figure 1:
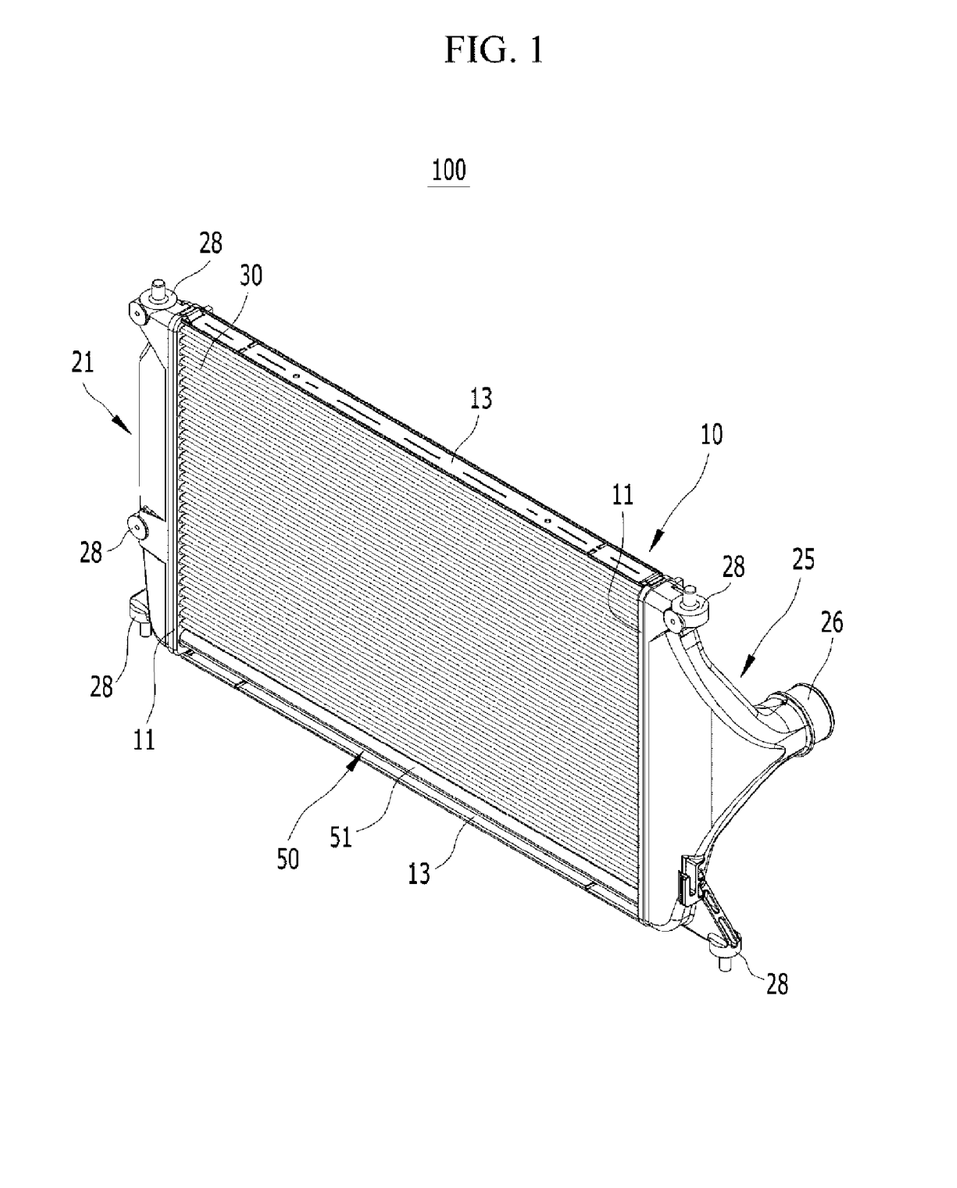
FIG. 1 and FIG. 2 are perspective view showing an exemplary intercooler for a vehicle according to the present invention.
Figure 2:
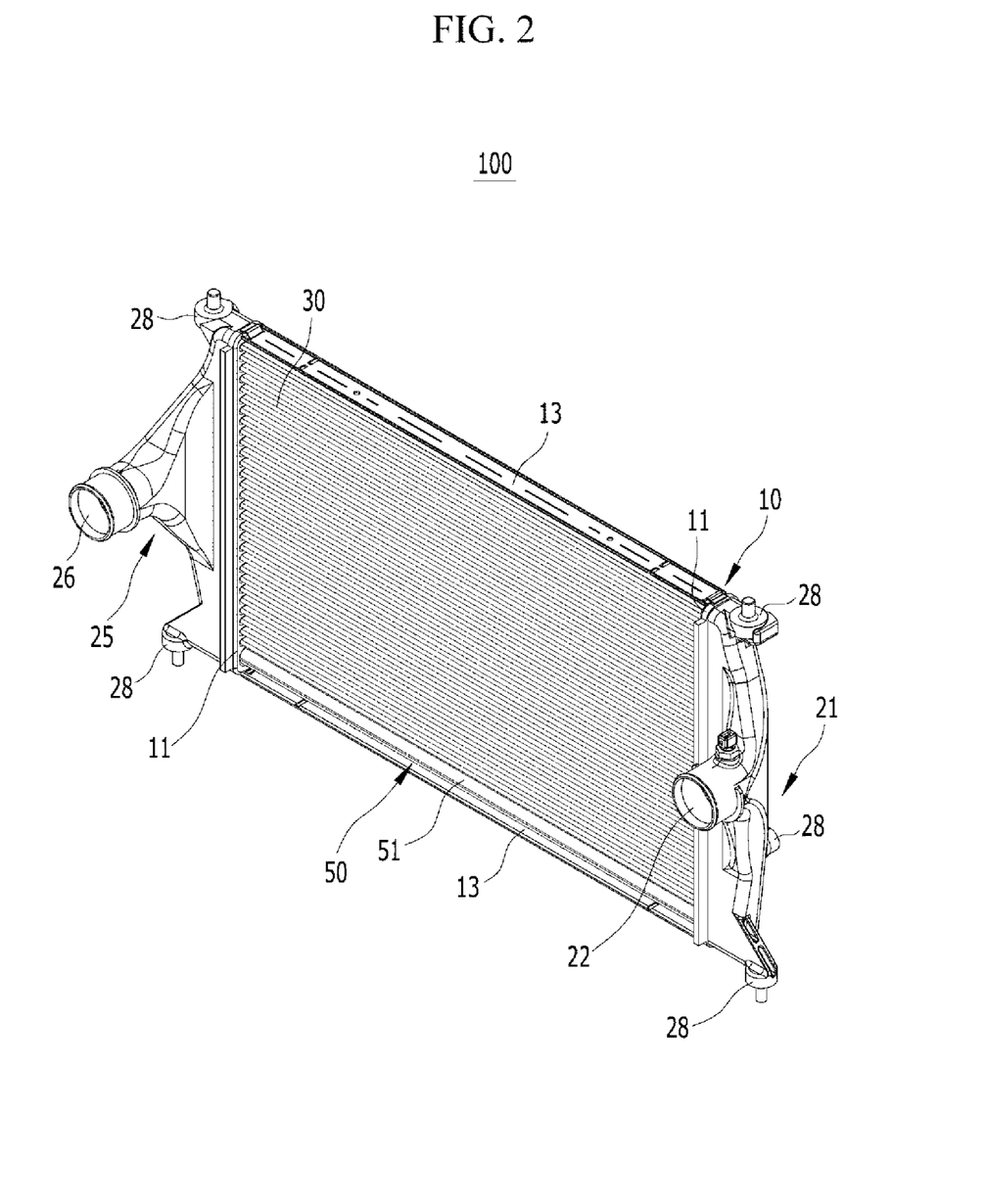
Figure 3:
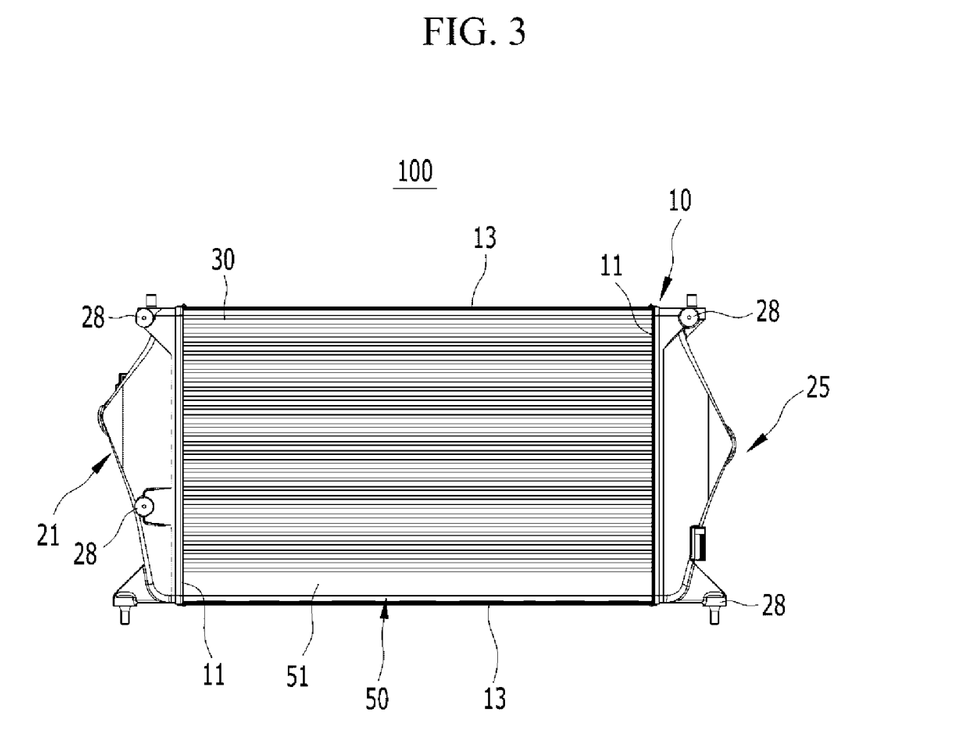
FIG. 3 is a schematic diagram of a front view of FIG. 1.

FIG. 1 and FIG. 2 are perspective view showing an intercooler for a vehicle according to various embodiments of the present invention, and FIG. 3 is a schematic diagram of a front view of FIG. 1.

Referring to the drawings, an intercooler 100 for a vehicle according to various embodiments of the present invention recirculates exhaust gas that is exhausted from an exhaust manifold of a diesel engine to an intake manifold, and can be applied to an exhaust gas recirculation (EGR) system that reduces nitrogen oxide (NOx) of exhaust gas.

For example, the EGR system includes a low pressure (LP) EGR system that can recirculate exhaust gas (hereinafter, EGR gas) that passes a catalyst such as a DPF (diesel particulate filter) to intake air of an intake manifold.

Here, the LP EGR system includes a turbocharger that uses energy of the exhaust gas to supercharge intake air.

Meanwhile, the EGR gas is mixed with intake air to be supplied to an intake manifold in the EGR system, wherein the mixed exhaust gas and intake air is called "mixed gas".

The intercooler 100 for a vehicle according to various embodiments of the present invention is used to cool the mixed gas that is supplied to the intake manifold to a predetermined temperature in the EGR system.

The intercooler 100 for a vehicle stores a predetermined amount of condensate that is generated when the saturated vapor of the EGR gas is cooled in various embodiments of the present invention.

For this, the intercooler 100 for a vehicle according to various embodiments of the present invention includes a cooler main body 10, connection tubes 30, and a condensate storage unit 50, which are explained as follows.

The cooler main body 10 supports constituent elements that are to be described below, which include external elements such as a bracket, a plate, a block, and a protrusion in various embodiments of the present invention.

The external elements are used to mount the intercooler 100 on the vehicle body in various embodiments of the present invention, and the external elements can be included in the cooler main body except in exceptional cases in various embodiments of the present invention.

The cooler main body 10 includes a pair of vertical members 11 that are disposed in parallel with each other with a predetermined distance therebetween, and a pair of parallel members 13 that connect up and down end portion of the vertical members 11 to each other in the drawing.

Further, an inlet portion 21 in which the mixed gas flows is formed at one side of the cooler main body 10, and an outlet portion 25 in which mixed gas flows out is formed at the other side thereof.

The inlet portion 21 has a tank shape to include an inlet port 22 through which the mixed gas is supplied and is fixed on the vertical member 11 of one side in the cooler main body 10.

Further, the outlet portion 25 has a tank shape to include an outlet port 26 through which the cooled mixed gas is discharged and is fixed on the vertical member 11 of the other side of the cooler main body 10.

Here, mounting members 28 are formed on the inlet portion 21 and outlet portion 25 to mount the intercooler 100 according to various embodiments of the present invention to a vehicle body. The mounting members 28 can be formed at an upper portion, a low portion, and/or a middle portion of the inlet portion 21 and the outlet portion 25.

The connection tube 30 is used to make the mixed gas that is supplied through the inlet portion 21 of the cooler main body 10 to discharge through the outlet portion 25 in various embodiments of the present invention.

Several connection tubes 30 can be prepared and arranged along the up/down direction of the cooler main body 10 based on the drawing.

Both end portions of the connection tube 30 penetrate the vertical members 11 of the cooler main body 10 to be connected to the inlet portion 21 and the outlet portion 25, and are fixed to the vertical member 11.

The connection tubes 30 have a flat tube shape having passages that enable the mixed gas to flow therein.

Figure 4:
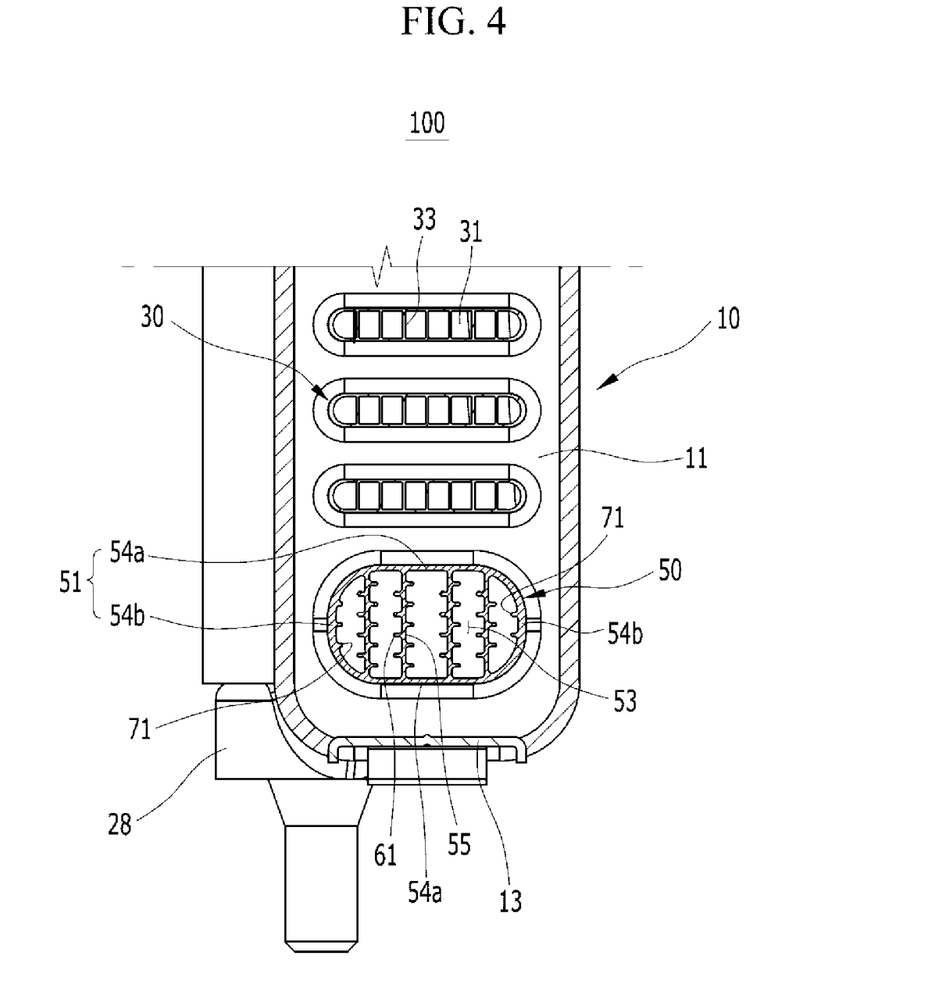
FIG. 4 is a schematic diagram of a partial cross-sectional view of an exemplary inter cooler for a vehicle according to the present invention.

In this case, as shown in FIG. 4, several first connection passages 31 are formed in the connection tube 30 along the length direction thereof to connect the inlet portion 21 with the outlet portion 25 of the cooler main body 10.

Here, the first connection passages 31 are connection passages for enabling the mixed gas to flow from the inlet portion 21 to the outlet portion 25, which is formed by a plurality of first barriers 33 that are disposed in the connection tube 30 along the length direction at a predetermined distance from each other.

Accordingly, the mixed gas that is supplied through the inlet portion 21 is discharged through the outlet portion 25 along the first connection passages 31 of the connection tube 30, and when the mixed gas passes the connection tubes 30, the mixed gas exchanges heat with air to be cooled to a predetermined temperature, and is supplied to the intake manifold of the engine through the outlet portion 25.

The condensate is formed during the process in which the mixed gas flows along the connection tubes 30 to be cooled down, and the condensate storage unit 50 is used to store the condensate in various embodiments of the present invention.

The condensate storage unit 50 is mounted on the cooler main body 10 at a lower side of the connection tubes 30 to connect a lower end portion of the inlet portion 21 with a lower end portion of the outlet portion 25.

The condensate storage unit 50 includes a reservoir tank 51 of a tube type that is disposed along the connection tube 30.

The reservoir tank 51 has a condensate storage space that can store a predetermined amount that is larger than a maximum condensate amount of the entire intercooler 100.

Both end portions of the reservoir tank 51 penetrate the vertical members 11 of the cooler main body 10 to be respectively connected to the inlet portion 21 and the outlet portion 25, and are fixed to the vertical members 11.

Figure 5:
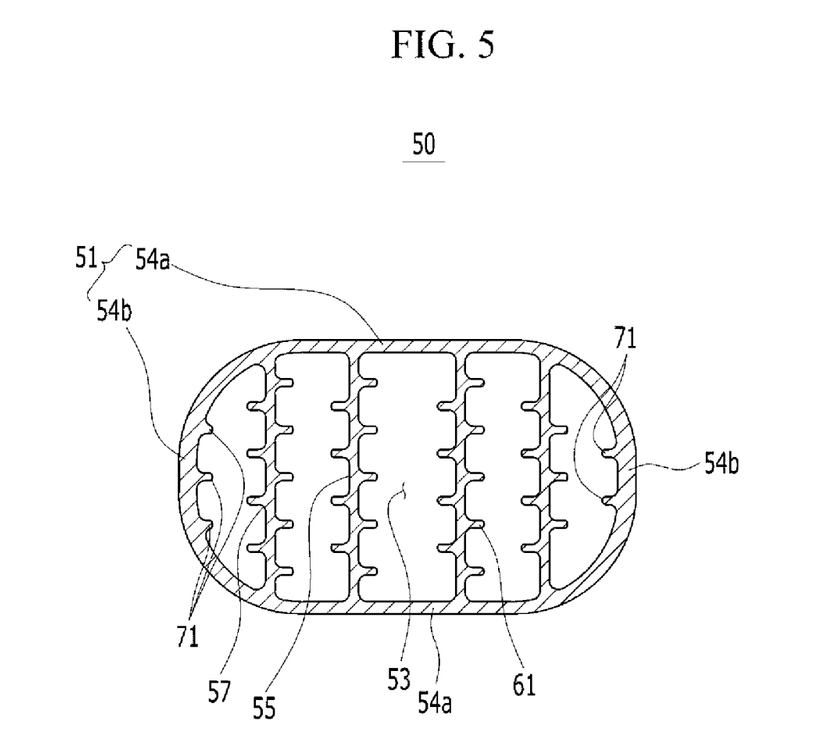
FIG. 5 is a schematic diagram of a cross-sectional view showing an exemplary condensate storage unit that is applied to an intercooler for a vehicle according to the present invention.

Here, as shown in FIG. 4 and FIG. 5, the reservoir tank 51 includes first parts 54a that are disposed at an upper side and a lower side to be parallel with each other along the length direction of the connection tubes 30, and second parts 54b that integrally connect both edge ends of the first part 54a with each other to have a outwardly convex rounded shape. One will appreciate that in various embodiments the first and second parts may be monolithically formed.

Further, the condensate is stored in the reservoir tank 51 which is provided with second connection passages 53 that are formed along the length direction to connect the inlet portion 21 with the outlet portion 25.

In this case, the second connection passages 53 are condensate storage spaces for storing condensate, and can be formed by second barriers 55 that are disposed along the length direction in the reservoir tank 51 at a predetermined distance from each other.

Meanwhile, the reservoir tank 51 according to various embodiments of the present invention includes the second barriers 55 and a plurality of ribs 61 that are integrally formed at both sides surfaces of the second barrier 55 to prevent noise derived from the surge of the condensate that is stored in the condensate storage space. One will appreciate that in various embodiments the barriers and the ribs may be monolithically formed.

That is, the second barriers 55 to which the ribs 61 are integrally formed can be substituted by a baffle plate for preventing sway of the condensate that is stored in the second connection passages 53.

The ribs 61 protrude on both sides of the second barrier 55 along the length direction of the reservoir tank 51.

Further, a rounded portion of a predetermined curvature (57 in FIG. 5) is formed at a portion where the surface of the second barrier 55 is connected to the rib 61, wherein the rounded portion 57 guides the condensate that flows in the second connection passages 53 to the bottom of the reservoir tank 51.

The rib 61 that is formed on one side surface of the second barrier 55 is disposed between a pair of ribs 61 that are formed on the other side surface thereof based on both side surfaces of the second barrier 55.

The crossed structure effectively prevents the sway of the condensate that is stored in the second connection passages 53 of the reservoir tank 51.

Figure 6:
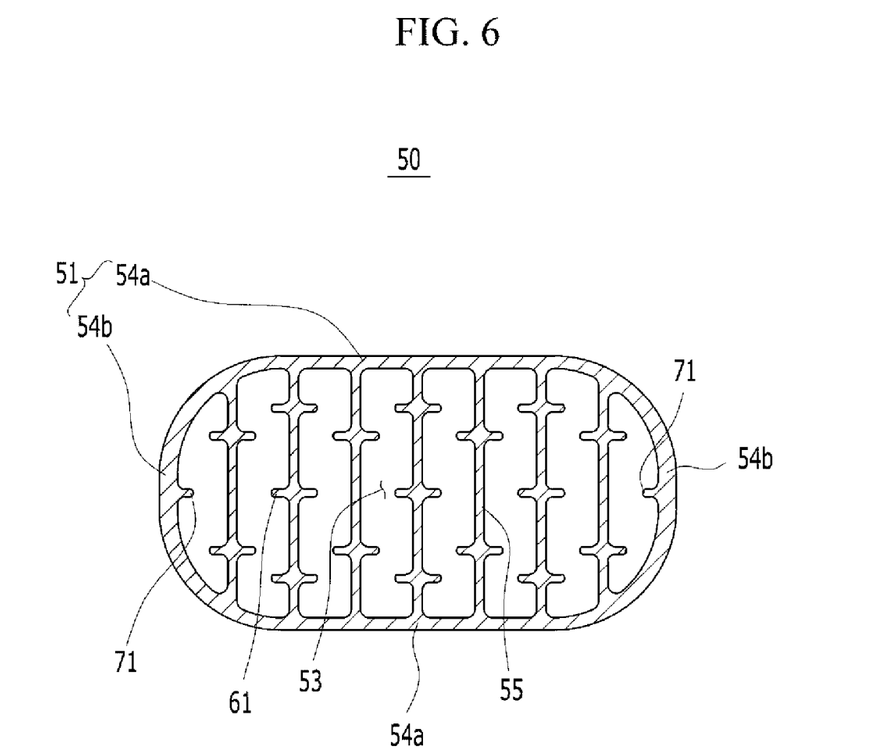
FIG. 6 is a schematic diagram of a cross-sectional view showing an exemplary variation of a condensate storage unit that is applied to an intercooler for a vehicle according to the present invention.

On the other hand, as shown in FIG. 6, as an exemplary variation, the rib 61 that is formed on one side surface of the second barrier 55 can be formed in the same position as that of the rib that is formed on the other side surface of the second barrier 55 based on both side surfaces of the second barrier 55.

In this case, the rib 61 that is formed on a side surface of a second barrier 55 is formed between a pair of ribs 61 that are formed on a neighboring second barrier 55 based on the facing surfaces of the second barriers 55.

On the other hand, at least one rib 71 can be formed on an interior surface of the second part 54b along the length direction in the reservoir tank 51 so as to prevent the sway of the condensate that is stored in the second connection passages 53 in various embodiments of the present invention.

Here, as shown in FIG. 6, only one rib 71 is formed on an interior surface of each of the second parts 54b.

Further, as shown in FIG. 5, two or three ribs 71 can be formed on an interior surface of each of the second parts 54b.

The number of ribs 71 can be varied according to the storage capacity of the reservoir tank 51, and therefore it is not limited to a predetermined value.

Accordingly, the mixed gas of the EGR gas and the intake air in the EGR system flows in through the inlet portion 21 in the intercooler 100 for a vehicle according to various embodiments of the present invention.

The mixed gas that flows in the inlet portion 21 is supplied to the outlet portion 25 through the first connection passages 31 of the connection tube 30, exchanges heat with cooling air passing through the gap between the connection tubes 30 to be cooled down to a predetermined temperature, and is supplied to the intake manifold of the engine through the outlet portion 25.

The mixed gas flows through the connection tubes 30, and while the cooling air cools the mixed gas, the saturated vapor of the EGR gas is condensed to generate condensate, and the condensate is stored in the reservoir tank 51 of the condensate storage unit 50.

That is, the condensate can be stored in the second connection passage 53 that is divided by the second barriers 55 in the reservoir tank 51.

The condensate is stored in the second connection passages 53 of the reservoir tank 51, and the surplus thereof can be supplied to a combustion chamber of the engine through the outlet portion 25.

As described above, the intercooler 100 for a vehicle according to various embodiments of the present invention includes the condensate storage unit 50 that can store the condensate to maximize the storage capacity compared to the generated total amount of condensate.

Accordingly, the storage capacity of the condensate is improved through the condensate storage unit 50 in various embodiments of the present invention, and crack damage of the intercooler 100 caused by freezing of the condensate can be prevented.

Also, the second barriers 55 are formed in the reservoir tank 51 of the condensate storage unit 50 in various embodiments of the present invention, and because the ribs 61 and 71 are formed on the interior surface of the second barriers 55 and the second parts 54b, the sway of the condensate that is stored in the second connection passages 53 is prevented and the noise thereof can be reduced.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intercooler for a vehicle cooling a mixture of EGR gas and exhaust gas, comprising:
 a cooler main body having an inlet portion and an outlet portion,
  wherein the inlet portion through which the mixture flows in is formed at a first side of the cooler main body; and
  wherein the outlet portion through which the mixture flows out is formed at a second end side of the cooler main body;
 a plurality of connection tubes connecting the inlet portion with the outlet portion and arranged from an upper side to a lower side of the cooler main body to cool the mixture; and
 a condensate storage unit connecting a lower end portion of the inlet portion with a lower end portion of the outlet portion and storing condensate formed in the plurality of connection tubes in cooling down the mixture of the EGR gas and the exhaust gas,
 wherein the condensate storage unit includes:
  a tube-type reservoir tank disposed at the cooler main body at a lowest side of the plurality of connection tubes and disposed along the connection tubes; and
 second connection passages disposed in the reservoir tank along a length direction thereof and connecting the inlet portion with the outlet portion, wherein the second connection passages are formed by second barriers disposed adjacent each other in the length direction thereof inside the reservoir tank for preventing sway of the condensate stored in the condensate storage unit and both distal ends of each second barrier is directly connected to an inner surface of the reservoir tank, and
 ribs protruding on both surfaces of the second barriers along the length direction of the reservoir tank for preventing the sway of the condensate and noise caused by the sway in the condensate storage unit.

2. The intercooler for the vehicle of claim 1, wherein first connection passages are formed in the connection tubes along a direction thereof to connect the inlet portion with the outlet portion.

3. The intercooler for the vehicle of claim 2, wherein the first connection passages are formed by first barriers formed along the length direction thereof in the connection tubes.

4. The intercooler for the vehicle of claim 1, wherein the reservoir tank comprises:
 a first part disposed in an up and down direction along a length direction of the connection tubes; and
 a second part integrally formed with both edge ends of the first part and having a convex rounded shape.

5. The intercooler for the vehicle of claim 1, wherein one rib formed on a first side surface of a single second barrier is disposed between a pair of ribs formed a second side surface of the single second barrier.

6. The intercooler for the vehicle of claim 1, wherein one rib formed at a first side surface on a single second barrier is formed at the same position as another rib formed on a second surface of the second barrier facing the single second barrier.

7. The intercooler for the vehicle of claim 6, wherein one rib formed at the first side surface on the single second barrier is formed between a pair of ribs formed on the second surface of the second barrier facing the single second barrier.

8. The intercooler for the vehicle of claim 1, wherein a rounded portion of a predetermined curvature is formed at a portion where the ribs are connected to the second barriers.

9. The intercooler for the vehicle of claim 5, wherein at least one rib protrudes on an interior surface of the second part along the length direction thereof.

* * * * *

UNITED STATES PATENT AND TRADEMARK OFFICE
CERTIFICATE OF CORRECTION

PATENT NO. : 9,249,718 B2  
APPLICATION NO. : 13/529874  
DATED : February 2, 2016  
INVENTOR(S) : Yoon et al.

Page 1 of 1

It is certified that error appears in the above-identified patent and that said Letters Patent is hereby corrected as shown below:

On the title page, in item (73) Assignees, please delete "Kia Motors Company, Seoul (KR)" and insert therefor: --Kia Motors Corporation, Seoul (KR)--.

Signed and Sealed this  
Twenty-third Day of August, 2016

Michelle K. Lee  
*Director of the United States Patent and Trademark Office*